US010173741B2

(12) United States Patent
Barajas

(10) Patent No.: US 10,173,741 B2
(45) Date of Patent: Jan. 8, 2019

(54) FORWARD VIEWING BICYCLE MIRROR

(71) Applicant: Antonio J. Barajas, Alvin, TX (US)

(72) Inventor: Antonio J. Barajas, Alvin, TX (US)

(*) Notice: Subject to any disclaimer, the term of this patent is extended or adjusted under 35 U.S.C. 154(b) by 0 days.

(21) Appl. No.: 15/587,395

(22) Filed: May 4, 2017

(65) Prior Publication Data
US 2017/0369116 A1  Dec. 28, 2017

Related U.S. Application Data

(60) Provisional application No. 62/331,886, filed on May 4, 2016.

(51) Int. Cl.
*B62J 29/00* (2006.01)
*B62J 11/00* (2006.01)
*G02B 7/182* (2006.01)

(52) U.S. Cl.
CPC ............ *B62J 29/00* (2013.01); *B62J 11/00* (2013.01); *G02B 7/182* (2013.01)

(58) Field of Classification Search
CPC ............ B62J 29/00; B62J 11/00; G02B 7/182
USPC .................................... 359/842, 854
See application file for complete search history.

(56) References Cited

U.S. PATENT DOCUMENTS

| | | | | |
|---|---|---|---|---|
| 4,054,375 A | * | 10/1977 | Ribeca | B62J 29/00 359/842 |
| 4,375,316 A | * | 3/1983 | Le Vantine | G02B 17/02 248/480 |
| 4,715,681 A | * | 12/1987 | Johnson | B62J 29/00 359/526 |
| 4,826,306 A | * | 5/1989 | Grissen | B62J 29/00 248/476 |
| 5,148,327 A | | 9/1992 | Gaxiola, Jr. | |
| 5,305,153 A | * | 4/1994 | Kochocki | B60R 1/10 359/842 |
| 5,760,865 A | * | 6/1998 | Webster | G02B 27/144 351/41 |
| 6,010,225 A | * | 1/2000 | Lerner | A61F 9/007 359/850 |
| 8,979,285 B1 | | 3/2015 | Sasaki | |
| 2002/0067557 A1 | * | 6/2002 | Coleburn | B60R 1/082 359/842 |
| 2003/0177857 A1 | * | 9/2003 | Chuang | B62J 29/00 74/551.8 |
| 2005/0088766 A1 | * | 4/2005 | Daviss | B62J 29/00 359/842 |
| 2007/0091480 A1 | * | 4/2007 | Varnes | B62J 29/00 359/842 |
| 2011/0261453 A1 | * | 10/2011 | Felt | A42B 3/0426 359/481 |
| 2013/0155533 A1 | * | 6/2013 | Hunter | B62J 29/00 359/842 |

* cited by examiner

*Primary Examiner* — Ricky D Shafer
(74) *Attorney, Agent, or Firm* — Delphine James

(57) ABSTRACT

A forward view mirror housing is coupled to an adjustable frame attachment which attached to the handle bar of a conventional bicycle allowing a user to view forward while riding in a forward leaning position.

4 Claims, 4 Drawing Sheets

FORWARD VIEWING BICYCLE MIRROR

BACKGROUND OF THE INVENTION

Background

Cycling is a popular sport today. Riding a conventional bicycle with 10-speed bicycle with multiple gears requires users to ride in a forward leaning position. A rider of a conventional 10-speed bicycle sits on a seat and grips a pair of handlebars attached to the front wheel of the bicycle. Because the seat is typically almost as high as the handlebars, the rider sits in a forward-leaning position, and the rider must keep his or her head raised while riding to forward view any obstructions on the road. However, this position of the head tires the rider's neck muscles thereby making the bike ride uncomfortable. The present invention discloses an improved forward viewing bicycle mirror assembly which allows the rider to ride in a head down position and still forward view any obstructions in the road.

SUMMARY

Illustrative embodiments are further generally directed to a forward view bicycle mirror assembly for attachment to a handlebar of a bicycle. An illustrative embodiment of the forward view bicycle mirror assembly includes an elongated assembly frame adapted for attachment to the handlebar. One of the objectives of this invention is to allow a bicycle rider to ride his bicycle in a forward leaning position such that the neck muscles are not easily tired.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
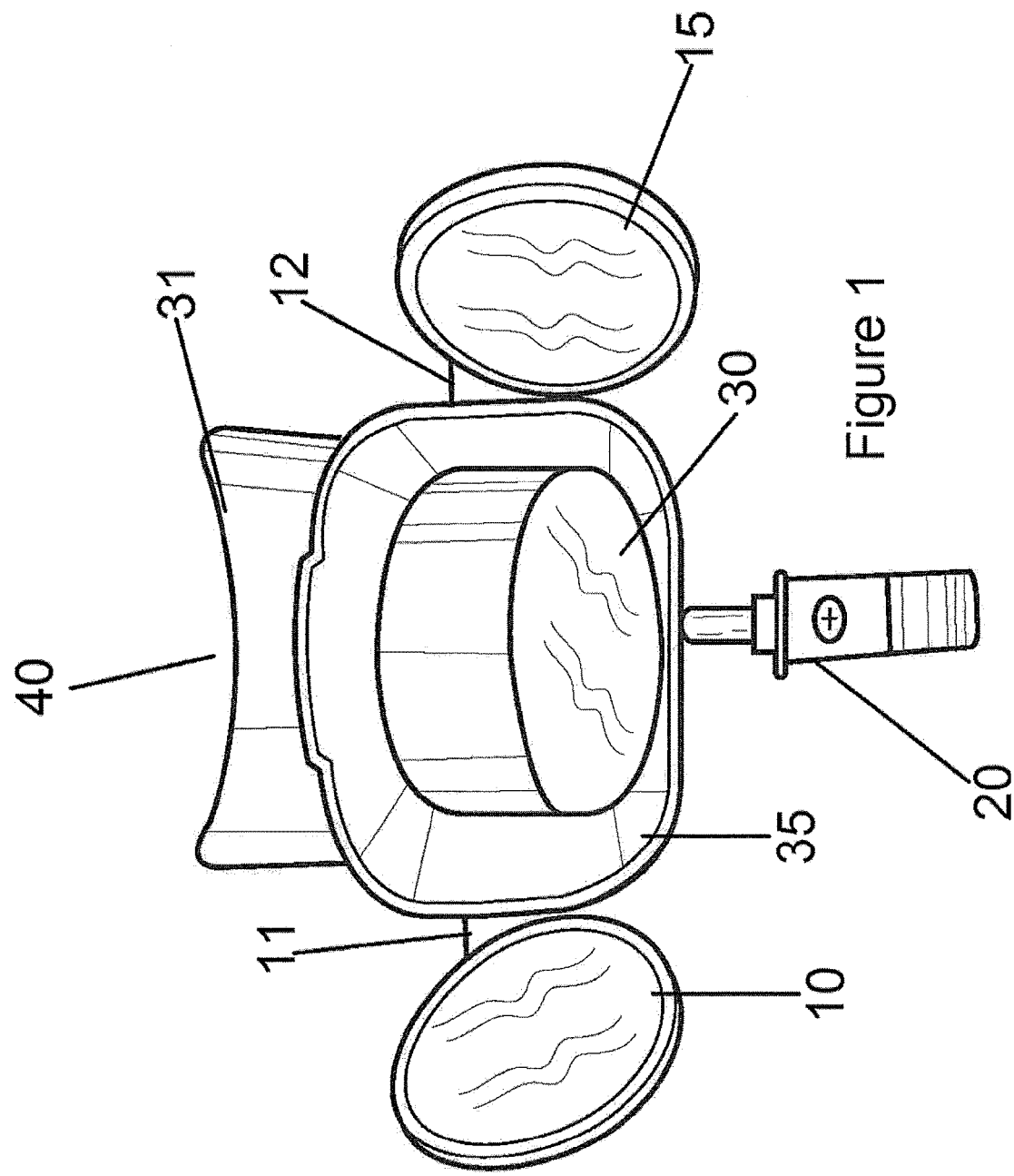
FIG. 1 is a front view of an illustrative embodiment of the mirror assembly.
Figure 2:
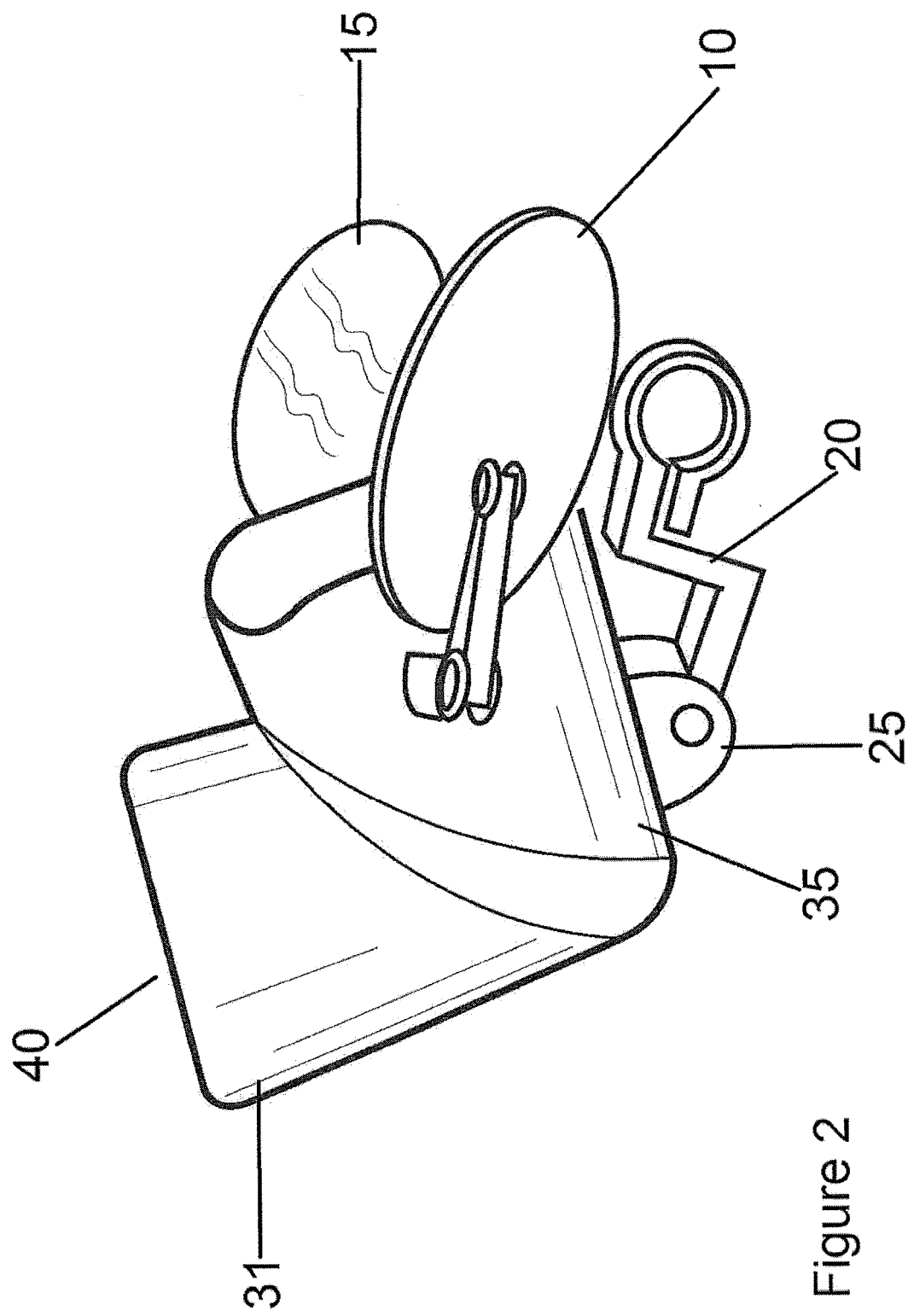
FIG. 2 is a side view of an illustrative embodiment of the mirror assembly.
Figure 3:
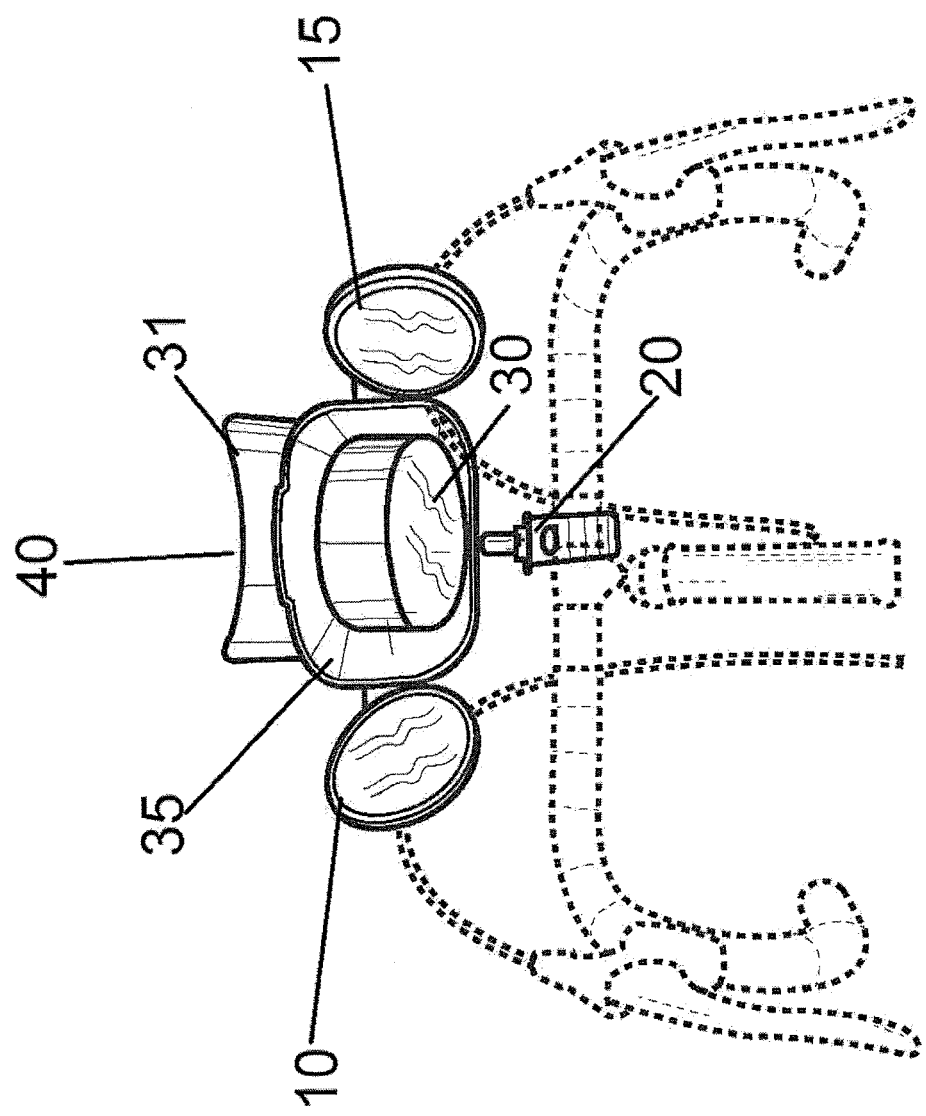
FIG. 3 is a front view of the mirror assembly attached to handle bar.
Figure 4:
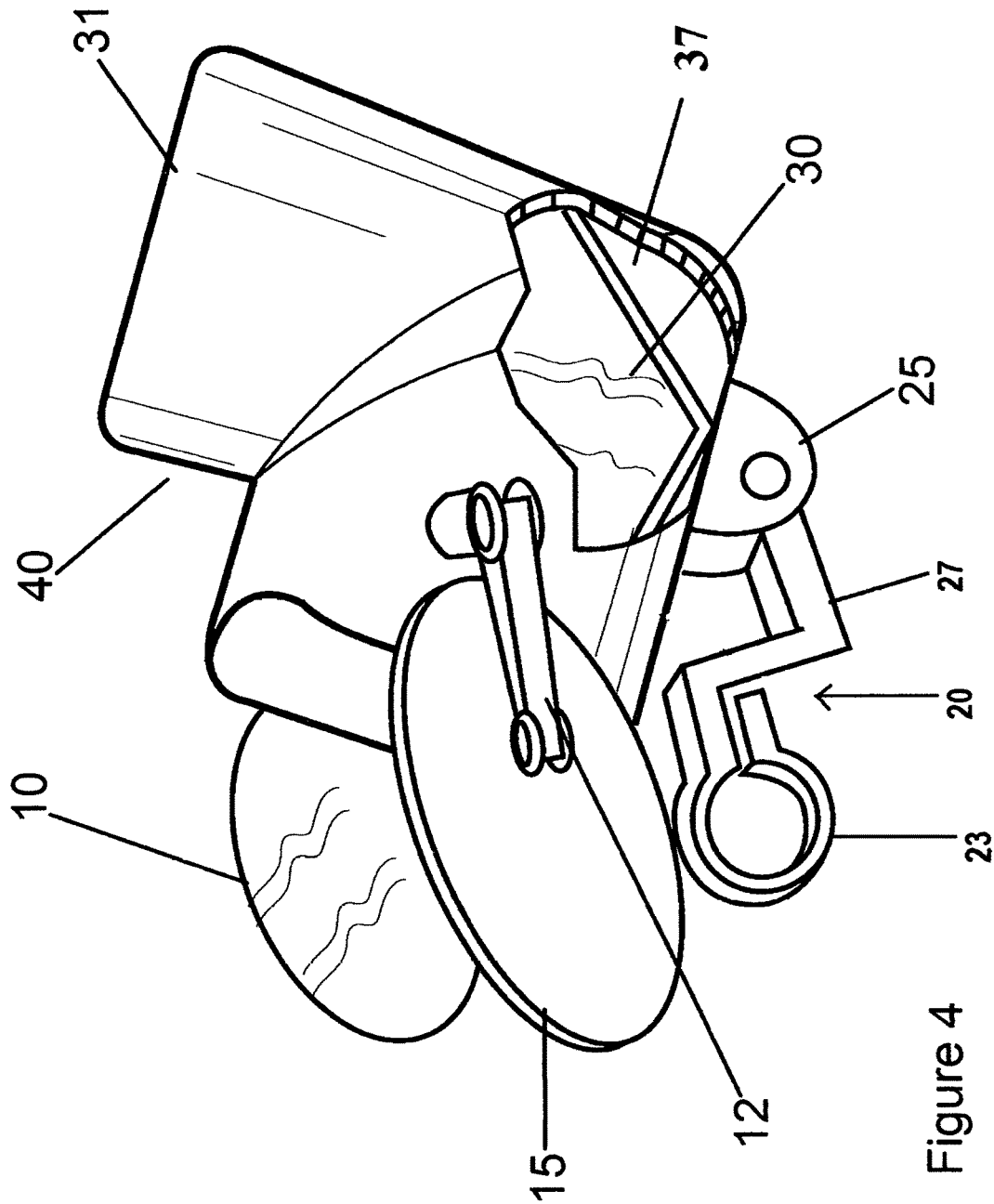
FIG. 4 is a side cross-section view illustrating mirror within the housing.

Referring initially to FIGS. 1-4 of the drawings, an illustrative embodiment of the forward view bicycle mirror assembly is generally indicated by reference numeral 40. As will be hereinafter further described, the forward view bicycle mirror assembly (40) is adapted to be mounted on the handlebars of a conventional as shown in FIG. 3. The present invention comprises a mirror housing (40), a frame bracket assembly (20) and opposing review mirror (10,15).

The forward view bicycle mirror assembly (40) enables a bicycle rider to view an area in front of the moving bicycle without the need for the bicycle rider to maintain his or her head in a raised position. This expedition prevents the neck muscles of the bicycle rider from tiring as readily as would otherwise be the case if the rider were required to maintain his or her head in a raised position to continually view the area in front of the moving bicycle. Consequently, the bicycle rider remains more comfortable while riding the bicycle, particularly on long rides.

Referring to FIGS. 1-4 of the drawings, The various components of the bicycle mirror assembly may be metal, plastic, composite and/or other suitable material and may be fabricating using casting, molding, machining and/or other suitable fabrication techniques known by those skilled in the art.

The mirror housing assembly (40) comprises a short top hollow vertical tubing member (31) that is securely integrated and attached in a perpendicular relationship with a forward extending hollow short horizontal tubular member (35). Mirror (30) is internally mounted at the perpendicular junction of the vertical and horizontal tubular members (31, 35). Compartment (37) is formed at the perpendicular juncture within the housing. The positioning of mirror (30) is mounted in a slightly angular position to allow the forward image to be reflected within mirror (30) for viewing by the user while riding.

Top tubing member (31) is aligned along the longitudinal axis of the mirror housing assembly (40) and is defined by an opened top end forming the eye piece for the bicycle rider. The lower end to the top tubular member forms an opened arc disposed above a median point of the internal mirror. The lower end of the bottom tubing member forms a mating arc that is fixably attached to the lower of the bottom tubing. The opened end of the bottom tubing forms a conduit to receive the reflective image in the mirror. The internal junction forms a compartment for receiving a base to support the internal mirror. The lower joined ends of the top and bottom tubular member arc forms an angular connection therebetwen.

The mirror can be circular, oval, rectangular or another suitable shape to reflect the image. The opening of the tubular member can be curved and must be large enough to support a user's vision. The opening of the tubular member is large enough to support the viewing of the forward reflective image. Reflective surface of the mirror (30) may be flat or planar. However it can be convex or concave for a different angle of view. When installed the mirror is forward facing at a slight angle in the direction of motion of the bicycle.

On opposing sides of horizontal tubular member (35) are left rear view mirror (10) and right rear view mirror (15) that are respectively coupled thereto through a rotating arm (11, 12). Rotating arm (11, 12) comprises a first portion externally and fixably mounted to a side of the horizontal tubular member (35). A ball bearing is operationally coupled and seated within a recessed portion of the first portion of the rotating arm (11, 12). As depicted each rear view mirror (10, 15) is rotatably coupled to the ball bearing. In use, each arm (11, 12) can be independently rotated 360 degrees to a desired position to allow the user to view in the rear. In the depicted embodiment each mirror is circular. However, the shape of each mirror is not limited as depicted.

As depicted, frame bracket assembly (20) forms an L shape and comprises a top portion (25) and a lower shaft portion (27). The top portion (25) is externally and fixably mounted to the underside of forward extending horizontal member (35) and extends externally downward therefrom to a lower end. The top end of the lower shaft portion (25) is pivotally attached to the lower end of the top portion (25) wherein a user can selectively position the mirror housing (40) to a desired position along the longitudinal axis of the bicycle. A fastener (23) is attached to the opposite lower end of the lower shaft portion (27) of frame bracket assembly (20). The upper end of the top portion of the bracket assembly (20) is pivotally connected to the underside of the bottom tubular member. The opposing end of the bracket assembly (20) is pivotally connected to the handle bar connector which is removably connected to the handle bar of the bicycle.

The bracket assembly allows the entire mirror housing to end backward and forward to a selectively desired position a linear distance based upon the length of the bracket assembly in front or backward from the bicycle handle bar.

The upper end pivot connection allows the mirror housing to pivot back and forward to a selective position for viewing the image in the reflective mirror.

In use of the bicycle mirror assembly (40), the fastener (23) of the lower shaft portion (27) of the frame bracket assembly (20) is adapted for attachment to a handlebar on the bicycle. As illustrated in FIG. 3, frame bracket assembly (20) can be mounted such that mirror assembly (40) is oriented in a generally parallel relationship to the longitudinal bicycle axis of the bicycle. Then rear view mirrors (10, 15) are rotated into a desired position for rear viewing.

What is claimed is:

1. A forward viewing bicycle mirror that attaches to a handle bar of a bicycle, the device comprising:
    a mirror housing supported by a bracket assembly that engages with the handle bar;
    the bracket assembly having one end with an integrally formed fastener configured to engage with the handle bar and an opposing end pivotally attached to an underside of the mirror housing;
    the mirror housing comprising a short hollow vertical tubular member securely and perpendicularly joined to a forwardly extending short hollow horizontal tubular member wherein a compartment is internally formed at a perpendicular juncture;
    the compartment configured to seat a reflective mirror in an angular position;
    the vertical tubular member having a top opening in the shape of an arc that forms an eyepiece that is aligned along the longitudinal axis of the reflective mirror;
    the horizontal tubular member having an opening that forms a conduit to receive a forward reflective image that can be seen within the reflective mirror through the eyepiece while a user is riding the bicycle looking downward.

2. The device of claim 1 further comprising:
    a first rear view mirror assembly having a first arm and a first side reflective mirror,
    the first side reflective mirror having a backside;
    a first arm having one end externally attached to a side of the mirror housing in a parallel arrangement and extending to a first terminating end that is rotatbly connected to the backside of the first side reflective mirror.

3. The device of claim 2 further comprising:
    a second rear view mirror assembly having a second arm and a second side reflective mirror;
    the second side reflective mirror having a backside;
    a second arm having one end externally attached to an opposing side of the mirror housing in a parallel arrangement and extending to a second terminating end that is rotatbly connected to the backside of the second side reflective mirror.

4. The device of claim 1 wherein the bracket assembly is configure to be selectively pivoted in various positions.

* * * * *